(12) United States Patent
Fujita et al.

(10) Patent No.: US 11,378,696 B2
(45) Date of Patent: Jul. 5, 2022

(54) LOCAL ERROR GENERATION DEVICE, COMPUTER READABLE MEDIUM, AND POSITIONING AUGMENTATION INFORMATION DISTRIBUTION SYSTEM

(71) Applicant: Mitsubishi Electric Corporation, Chiyoda-ku (JP)

(72) Inventors: Seigo Fujita, Chiyoda-ku (JP); Masakazu Miya, Chiyoda-ku (JP); Yuki Sato, Chiyoda-ku (JP); Hayato Shiono, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 479 days.

(21) Appl. No.: 16/348,771

(22) PCT Filed: Nov. 15, 2016

(86) PCT No.: PCT/JP2016/083851
§ 371 (c)(1),
(2) Date: May 9, 2019

(87) PCT Pub. No.: WO2018/092193
PCT Pub. Date: May 24, 2018

(65) Prior Publication Data
US 2020/0064486 A1   Feb. 27, 2020

(51) Int. Cl.
*G01S 19/07* (2010.01)
*G01S 19/08* (2010.01)
*G01S 19/28* (2010.01)

(52) U.S. Cl.
CPC ............ *G01S 19/073* (2019.08); *G01S 19/08* (2013.01); *G01S 19/28* (2013.01)

(58) Field of Classification Search
CPC ......... G01S 19/073; G01S 19/08; G01S 19/28
USPC ....................................... 342/357.44, 357.25
See application file for complete search history.

(56) References Cited

U.S. PATENT DOCUMENTS

2015/0247931 A1*  9/2015  Leandro ................ G01S 19/074
342/357.44

FOREIGN PATENT DOCUMENTS

| JP | 2015-1426 A | 1/2015 |
|---|---|---|
| JP | 2015-219087 A | 12/2015 |

OTHER PUBLICATIONS

Australian Office Action dated Jan. 29, 2020 in Australian Patent Application No. 2016429809, 3 pages.
Extended European Search Report dated Dec. 4, 2019 in European Patent Application No. 16921617.3, 24 pages.

(Continued)

*Primary Examiner* — Bo Fan
(74) *Attorney, Agent, or Firm* — Oblon, McClelland, Maier & Neustadt, L.L.P.

(57) ABSTRACT

A local error estimation unit (515) of a local error generation device (500) estimates and generates local errors (δT, δI) based on global errors (δo, δt, δb) included in positioning augmentation information (81) produced in an electronic reference point network (120) and observed data (61) generated by receivers on electronic reference points (611, 612) not belonging to the electronic reference point network (120). The local errors (δT, δI) are errors that influence positioning accuracy in a region where the electronic reference points (611, 612) exist and that depend on the region where the electronic reference points (611, 612) exist.

12 Claims, 5 Drawing Sheets

(56) References Cited

OTHER PUBLICATIONS

Shively, C. A. et al. "Analysis of Specified and Hypothetical GPS IIIC Integrity for LPV 200 Operations", ION 2010 International Technical Meeting, XP056002186, Jan. 27, 2010, pp. 975-986.
Stoica, A-M. et al. "Fault Detection Algorithm Based on a Discrete-Time Observer Residual Generator—A GPS Application", Proceedings of the European Control Conference, XP032752041, Jul. 2, 2007, pp. 1587-1594.
International Search Report dated Feb. 14, 2017 in PCT/JP2016/083851 filed Nov. 15, 2016.
Fujita, S. et al., "The development status of Japanese QZSS Centimeter Level Augmentation Service (CLAS)—Design of Integrity Function," Proceedings of the $60^{th}$ Space Sciences and Technology Conference, The Japan Society for Aeronautical and Space Science, Sep. 6-9, 2016 (with English abstract).
Taniyama, A. et al., "Evaluation of generated augmentation information for PPP initial convergence time improvement," Proceedings of the 59th Space Sciences and Technology Conference, The Japan Society for Aeronautical and Space Science, Oct. 7-9, 2015 (with English abstract).
Asari, K. et al., "PPP in practice based on SSR using QZSS," [online], Apr. 25, 2014, Internet >URL: http://www.gnss-pnt.org/talkai26/programme.html> (with English translation).

\* cited by examiner

LOCAL ERROR GENERATION DEVICE, COMPUTER READABLE MEDIUM, AND POSITIONING AUGMENTATION INFORMATION DISTRIBUTION SYSTEM

TECHNICAL FIELD

The present invention relates to a local error generation device, a local error generation program, and a positioning augmentation information distribution system.

BACKGROUND ART

In recent years, development of GNSS (Global Navigation Satellite System) with use of positioning satellites of GPS (Global Positioning System), GLONASS, GALILEO, quasi-zenith satellites, and the like has been advancing and use of satellite positioning in which positioning signals from GNSS are observed and in which one's own absolute position is measured with use of the observed positioning signals has been spreading. Errors in satellite positioning are broadly divided into errors depending on positioning satellites (hereinafter referred to as satellites) to transmit positioning signals and errors depending on observation points, that is, regions. Among the errors depending on satellites are clock error and orbit error of satellites, both of which are errors not depending on but being common to observation points, that is, global errors. Hereinbelow, the errors depending on and being unique to satellites will be referred to as global errors. On the other hand, the errors depending on observation points are errors relating to ionosphere and troposphere around the observation points, which are local errors. Hereinbelow, the errors depending on observation points will be referred to as local errors.

An example of satellite correction algorithm that may be used in a wide area is PPP (Precise Point Positioning) to correct the global errors. With use of PPP, accurate positioning may be carried out uniformly anywhere, based on a small amount of data. On the other hand, however, it is difficult to make integer indefiniteness determination for carrier phase that is essential for the accurate positioning, so that the accurate positioning takes much time.

A method of relieving this disadvantage of PPP is a scheme referred to as PPP-RTK (Real Time Kinematic) or RTK-PPP, the scheme to correct the local errors as well as the global errors. By PPP-RTK, the integer indefiniteness determination for carrier phase is facilitated so that the accurate positioning may be carried out in a short time.

PPP-RTK, however, necessitates configuring a network of electronic reference points that are reference stations and thus has a problem in that a service range is limited regionally.

As for such regional limitation on the service range, a technique of expanding a service area without deterioration in positioning accuracy by integrating positioning augmentation information generated for every service area has been proposed (Patent Literature 1, for instance).

In relation to Patent Literature 1, however, the positioning augmentation information is produced on similar conditions for a regionally continuous range and a region remote from the regionally continuous range (a region 12 on a lower right side in FIG. 2 of Patent Literature 1). Therefore, there is a fear that observed data in the remote region may undesirably influence the positioning augmentation information to be generated.

CITATION LIST

Patent Literature

Patent Literature 1: JP 2015-1426 A

SUMMARY OF INVENTION

Technical Problem

It is an object of the present invention to provide a device to generate positioning augmentation information for isolated islands, which are regions where a service may not be received due to regional remoteness from a service range of a reference station network, without influencing positioning augmentation information for the service range when the positioning augmentation information for the isolated islands is distributed to the isolated islands.

Solution to Problem

A local error generation device according to the present invention includes an estimation unit to estimate and generate local errors that influence positioning accuracy in a region, based on global errors included in positioning augmentation information for positioning that is generated by a network, the global errors being caused by satellites to transmit positioning signals, and on observed data generated based on the positioning signals received by a receiver that does not belong to the network, the local errors depending on the region where the receiver exists and caused by propagation paths of the positioning signals.

Advantageous Effects of Invention

The local error generation device of the present invention includes the local error estimation unit. Therefore, a device to generate the positioning augmentation information for isolated islands without influencing the positioning augmentation information for a service range of the reference station network when the positioning augmentation information for the isolated island is distributed may be provided.

DESCRIPTION OF EMBODIMENTS

Embodiment 1

With reference to FIGS. 1 to 5, a local error generation device 500 according to Embodiment 1 will be described.

<Global Errors, Local Errors>

Global errors and local errors stated in relation to Embodiment 1 will be described. $\delta o$, $\delta t$, and $\delta b$ that are the global errors are errors caused by and being unique to satellites. $\delta o$ denotes a satellite orbit error,
$\delta t$ denotes a satellite clock error, and
$\delta b$ denotes a frequency bias error between frequencies.
Local errors $\delta I$, $\delta T$ in an estimation result respectively represent an ionospheric delay error and
a tropospheric delay error in an isolated island.

Figure 1:
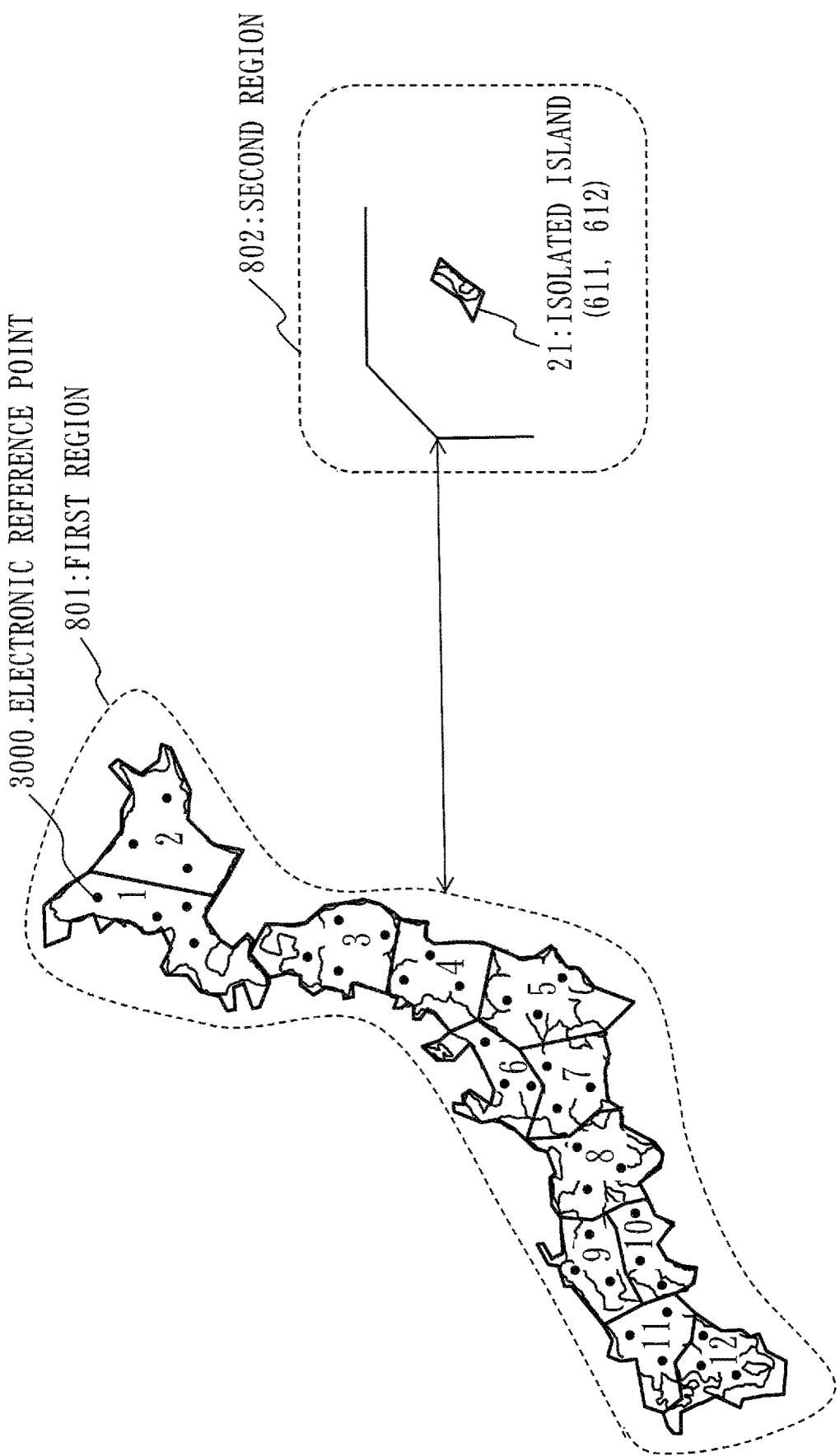
FIG. 1 is a diagram illustrating Embodiment 1 and illustrating a first region 801 where PPP-RTK is available.

FIG. 1 is a diagram illustrating a first region 801 where PPP-RTK is available. FIG. 1 illustrates Japan as an example and only a range of the first region 801 designated by a dashed line forms a service range where PPP-RTK is available.

Throughout the first region 801, a plurality of electronic reference points 3000 are placed at every interval of a specified distance between 10 km and 50 km, for instance. The plurality of electronic reference points 3000 of FIG. 1 merely represent general placement and do not represent accurate placement. The plurality of electronic reference points 3000 form a reference station network (electronic reference point network 120 to be described later) connected as a network.

Embodiment 1 discloses a system that makes PPP-RTK available in a second region 802, as well, which is greatly remote from the first region 801 as the service range for PPP-RTK, such as an isolated island 21 remote from Japan's main land, and in which configuration of a reference station network is unattainable. Hereinbelow, the reference station network will be referred to as the electronic reference point network.

In relation to Embodiment 1 below, a region that is greatly remote from the first region 801 as the service range for PPP-RTK and in which the configuration of the electronic reference point network is unattainable will be referred to as "isolated island". The isolated island is an expedient designation for intelligibility of description. The isolated island is not limited to a region surrounded by sea and may be connected to the first region 801 by land. For instance, the second region 802 may be a wilderness area, a specified part of top of a mountain, or the like where the plurality of electronic reference points 3000 to form the reference station network cannot be placed.

Figure 2:
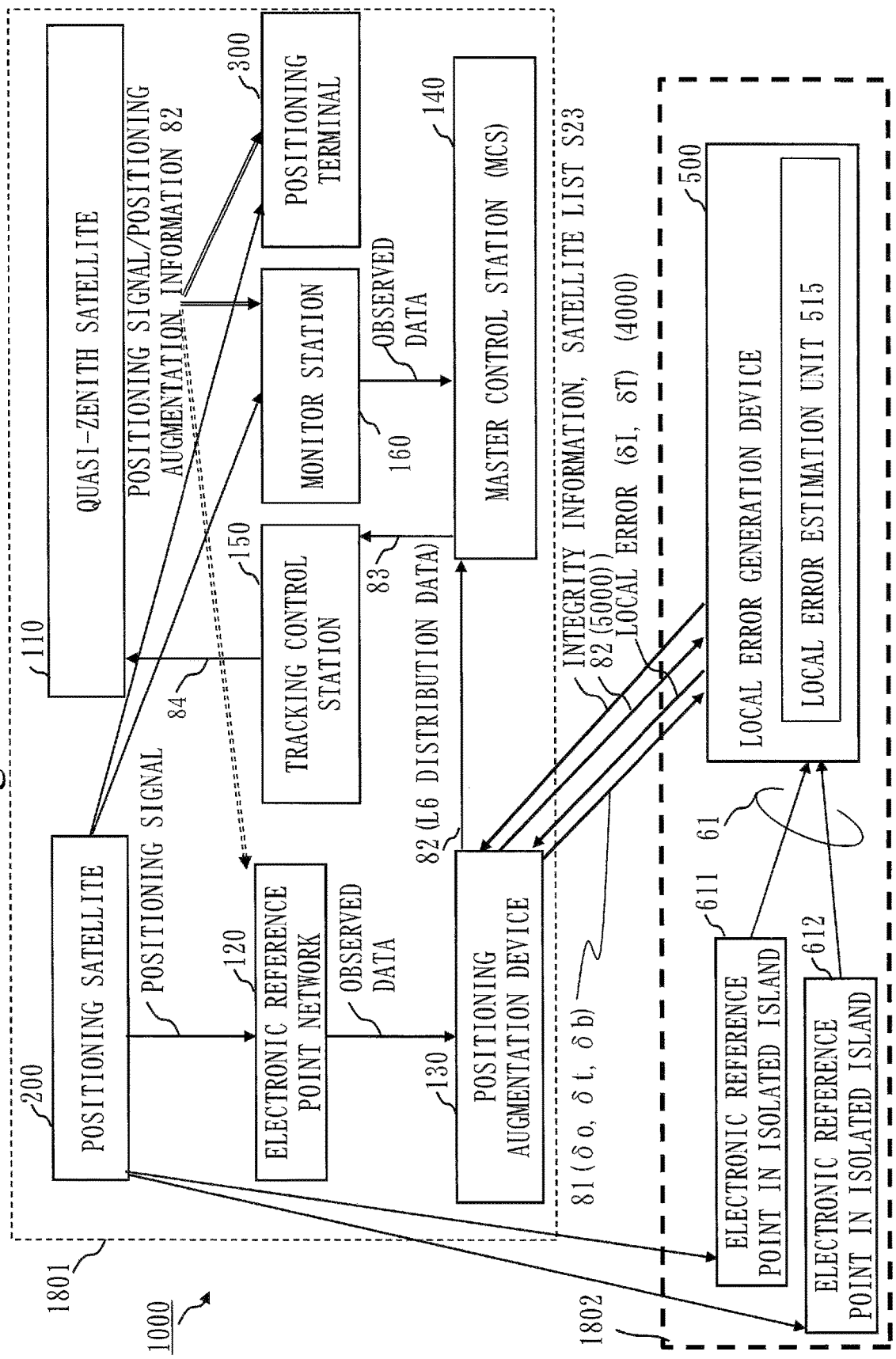
FIG. 2 is a diagram illustrating Embodiment 1 and illustrating a configuration of a positioning augmentation information generation system 1000 in which a local error generation device 500 is used.

FIG. 2 is a diagram illustrating a configuration of a positioning augmentation information generation system 1000 in which the local error generation device 500 is used. As illustrated in FIG. 2, the generation system 1000 includes a first-region system 1801 and a second-region system 1802. The first-region system 1801 corresponds to the first region 801. The first-region system 1801 in which the electronic reference point network is configured as described above generates positioning augmentation information 81 for the first region 801 based on data (observed data on positioning signals from positioning satellites including a quasi-zenith satellite 110 that are observed at each electronic reference point 3000) obtained from the electronic reference point network.

The first-region system 1801 includes the quasi-zenith satellite 110, the electronic reference point network 120, a positioning augmentation device 130, a master control station 140, a tracking control station 150, a monitor station 160, a positioning satellite 200, and a positioning terminal 300.

The electronic reference point network 120 may be an external configuration system with respect to the first-region system 1801.

The positioning augmentation device 130 generates the positioning augmentation information 81 based on the data collected from the electronic reference point network 120. The positioning augmentation device 130 is a transmission device to transmit the positioning augmentation information 81. In the first-region system 1801, the electronic reference point network is configured. The positioning augmentation device 130 for the first-region system 1801 generates the positioning augmentation information 81 to be used in the first region 801 where the electronic reference point network is formed, based on the data obtained from the electronic reference point network.

The second-region system 1802 corresponds to the second region 802. In the second-region system 1802, an electronic reference point network cannot be configured. In the second-region system 1802, the local error generation device 500 estimates the local errors $\delta I$, $\delta T$ for the isolated island, based on $\delta o$, $\delta t$, and $\delta b$ that are the global errors included in the positioning augmentation information 81 generated in the first-region system 1801 and observed values for two frequencies at electronic reference points in the isolated island. The local error generation device 500 transmits the local errors $\delta I$, $\delta T$ in the estimation result to the first-region system 1801. The first-region system 1801 generates positioning augmentation information 82, taking into account the isolated island.

<*Description of Configuration*>

Figure 3:
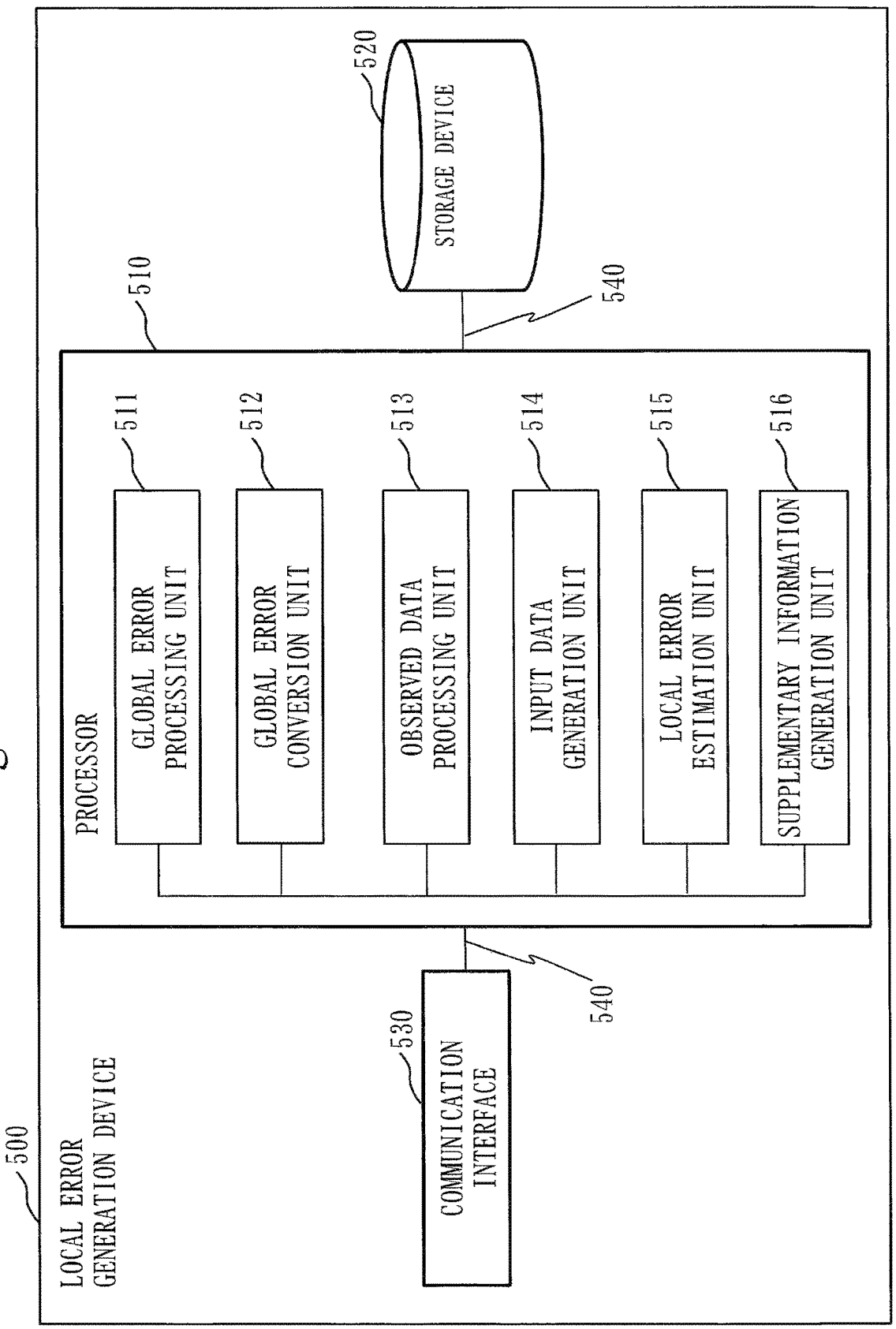
FIG. 3 is a diagram illustrating Embodiment 1 and illustrating a hardware configuration of the local error generation device 500.

FIG. 3 is a diagram illustrating a hardware configuration of the local error generation device 500. With reference to FIG. 3, the hardware configuration of the local error generation device 500 according to Embodiment 1 will be described. The local error generation device 500 is a computer. The local error generation device 500 includes a processor 510, a storage device 520, and a communication interface 530, as hardware. The processor 510 is connected to other hardware through signal lines 540 in order to control the other hardware. The local error generation device 500 is placed in the master control station 140. Functions of the local error generation device 500 may be integrated into a device in the master control station 140.

The processor 510 is an IC (Integrated Circuit) to carry out arithmetic processing. Specific examples of the processor 510 are CPU (Central Processing Unit), DSP (Digital Signal Processor), and GPU (Graphics Processing Unit).

The storage device 520 is a storage device in which a program to implement the functions of the local error generation device 500 is stored. A specific example of the storage device 520 is an HDD (Hard Disk Drive). The storage device 520 may be a portable storage medium such as SD (Secure Digital) memory card, CF (CompactFlash), NAND flash, flexible disk, optical disk, compact disc, Blu-ray (registered trademark) disc, or DVD (Digital Versatile Disk).

In the storage device 520, information received through the communication interface 530 and information generated by the processor 510 are stored.

The communication interface 530 is an interface for communication with devices such as receivers on the electronic reference points, the positioning augmentation device 130, and the master control station 140. Specific examples of the communication interface 530 are ports of Ethernet (registered trademark), USB (Universal Serial Bus), and HDMI (registered trademark; High-Definition Multimedia Interface).

The local error generation device 500 includes a global error processing unit 511, a global error conversion unit 512, an observed data processing unit 513, an input data generation unit 514, a local error estimation unit 515, and a supplementary information generation unit 516, as functional components. Functions of the global error processing unit 511, the global error conversion unit 512, the observed data processing unit 513, the input data generation unit 514, the local error estimation unit 515, and the supplementary information generation unit 516 are implemented by software. In the storage device 520, programs to implement the functions of the global error processing unit 511, the global error conversion unit 512, the observed data processing unit 513, the input data generation unit 514, the local error estimation unit 515, and the supplementary information generation unit 516 are stored. The programs are read into and executed by the processor 510. Thus the functions of the global error processing unit 511, the global error conversion unit 512, the observed data processing unit 513, the input data generation unit 514, the local error estimation unit 515, and the supplementary information generation unit 516 are implemented.

In FIG. 3, only one processor 510 is illustrated. The local error generation device 500, however, may include a plurality of processors that substitute for the processor 510. The plurality of processors share execution of the programs to implement the functions of the global error processing unit 511, the global error conversion unit 512, the observed data processing unit 513, the input data generation unit 514, the local error estimation unit 515, and the supplementary information generation unit 516. Each of the processors is an IC to carry out arithmetic processing, as with the processor 510.

<*Description of Operation*>

Figure 4:
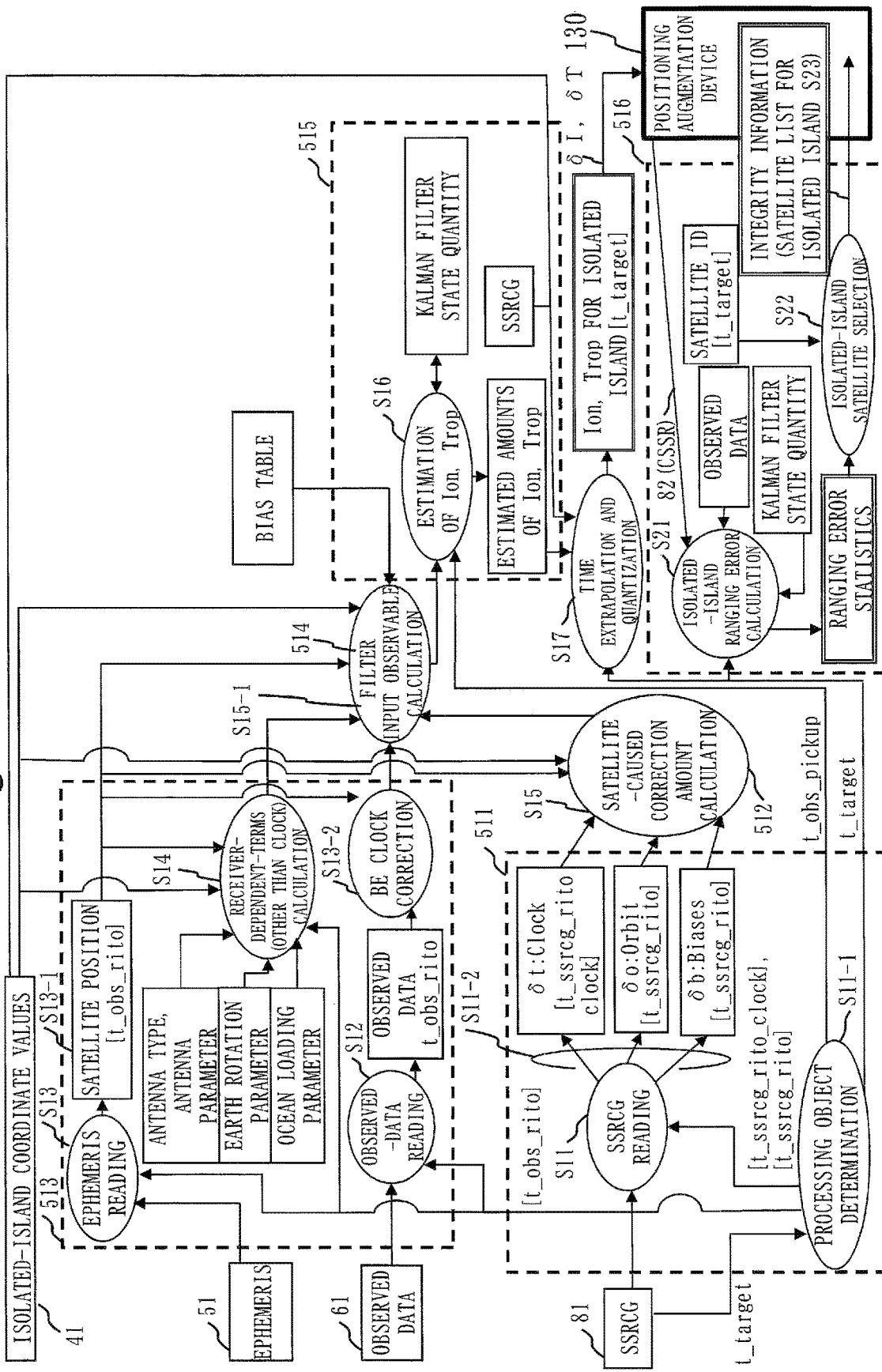
FIG. 4 is a diagram illustrating Embodiment 1 and illustrating a functional configuration of the local error generation device 500.

FIG. 4 is a diagram illustrating a functional configuration of the local error generation device 500. With reference to FIG. 4, operation of the local error generation device 500 will be described.

Into the local error generation device 500, as described above, the positioning augmentation information 81 (SSRCG) from the positioning augmentation device 130 is input.

The operation of the local error generation device 500 to be described below corresponds to a local error generation method according to Embodiment 1. The operation of the local error generation device 500 also corresponds to processes of a local error generation program according to Embodiment 1.

<Step S11: Reading of Positioning Augmentation Information 81>

In step S11, the global error processing unit 511 reads the positioning augmentation information 81 (SSRCG). The global error processing unit 511 receives the positioning augmentation information 81 from the positioning augmentation device 130.

In step S11-1, the global error processing unit 511 determines processing objects. The processing objects refer to positioning satellites to be processed.

In step S11-2, the global error processing unit 511 extracts the satellite clock errors δt, the satellite orbit errors δo, and the frequency bias errors 61) that are related to all the processing objects, that is, all the satellites, from the positioning augmentation information 81, based on a result of determination of the processing objects. The satellite clock errors δt, the satellite orbit errors δo, and the frequency bias errors δb are the global errors.

<Step S12: Reading of Observed Data 61>

In step S12, the observed data processing unit 513 reads observed data 61. The observed data processing unit 513 receives the observed data 61 from electronic reference points 611, 612 placed in the isolated island 21.

<Step S13: Reading of Ephemeris 51, Correction of Satellite Clock Error>

In step S13, the observed data processing unit 513 reads an ephemeris 51.

In step S13-1, in relation to the satellites determined in step S11-1, the observed data processing unit 513 calculates coordinate values of the satellites from the ephemeris 51.

In step S13-2, the observed data processing unit 513 uses parameters of the ephemeris 51 to calculate the satellite clock errors having the coordinate values determined and to correct the observed data 61 as in expressions below.

In expression 1 and expression 2 below, $c \cdot dt^{s, BE}$ and $c \cdot dt^{s, BE}$ are sections for correction and c represents speed of light.

Carrier: $\Phi^s_{rj} = \Phi^s_{rj} + c \cdot dt^{s, BE}$ (1)

Pseudorange: $P^s_{ij} = P^s_{rj} \cdot c \cdot dt^{s, BE}$ (2)

<Step S14: Calculation of Receiver-Dependent Terms (Other than Clock)>

In step S14, the observed data processing unit 513 calculates receiver-dependent terms other than clock. The observed data processing unit 513 uses (1) to (6) below for calculation of the receiver-dependent terms:

(1) satellite positions,
(2) coordinate values of the isolated island,
(3) antenna type and antenna parameter,
(4) earth rotation parameter,
(5) ocean loading parameter, and
(6) the result of the determination of the processing objects.

<Step S15: Calculation of Amount of Correction for Errors Caused by Satellites>

In step S15, the global error conversion unit 512 converts data formats of the satellite clock errors δt, the satellite orbit errors δo, and the frequency bias errors δb extracted in step S11-2 into data formats consistent with the corrected observed data 61 output from the observed data processing unit 513.

In step S15-1, the input data generation unit 514 uses (1) to (6) below to generate input data to be input into the local error estimation unit 515:

(1) the satellite clock errors δt, the satellite orbit errors δo, and the frequency bias errors δb output from the global error conversion unit 512,
(2) the observed data 61 corrected in step S13-2,
(3) the receiver-dependent terms calculated in step S14,
(4) the satellite positions calculated in step S13-1,
(5) the coordinates of the isolated island, and
(6) bias table.

<Step S16: Estimation of Ion, Trop of Isolated Island>

In step S16, the local error estimation unit 515 uses Kalman filter for the input data generated by the input data generation unit 514 and thereby estimates amounts of ionospheric delay Ion and amounts of vertical tropospheric delay Trop at the electronic reference points 611, 612 for each satellite. The local error estimation unit 515 carries out above estimation for all receivers on the electronic reference points placed in all isolated islands. The local error estimation unit 515 estimates and generates the local errors Trop, Ion for the isolated island, based on the global errors δo, δt, and δb included in the positioning augmentation information 81 and the observed data generated by a receiver not belonging to the electronic reference point network 120 from positioning signals received by the receiver. The global errors δo, δt, and δb are errors included in the positioning augmentation information 81 produced by the electronic reference point network 120 and caused by the satellites to transmit the positioning signals.

<Step S17: Processes of Time Extrapolation and Quantization>

In step S17, a process of time extrapolation of the local errors (Ion, Trop) for the isolated islands estimated in step S16 is executed till time (t_target) of distribution from the satellites with use of means such as linear extrapolation or Kalman filter. A quantization process is executed for the local errors (Ion, Trop) so as to attain conformity with a Compact SSR format. The local errors 6T, 61 for the isolated islands obtained in such a manner are errors that influence positioning accuracy in regions where the receivers exist, that are caused by propagation paths of the positioning signals, and that depend on the regions.

The local error generation device 500 inputs output information 4000 including δI, δT for the isolated islands generated by the local error estimation unit 515 in step S17 into the positioning augmentation device 130.

The positioning augmentation device 130 generates error information 5000 (positioning augmentation information 82 (CSSR)) that is generated as data in Compact SSR (CSSR) format and inputs the generated error information 5000 into isolated-island range error calculation S21 in the supplementary information generation unit 516 of the local error generation device 500.

The supplementary information generation unit 516 of the local error generation device 500 generates satellite lists S23 for the isolated-islands and inputs the satellite lists S23 for the isolated-islands into the positioning augmentation device 130.

The positioning augmentation device 130 generates the positioning augmentation information 82 to be described later that is generated as the data in Compact SSR format including the satellite lists S23 for the isolated-islands.

Among references related to Compact SSR (State Space Representation) scheme is a paper by Fujita, et al. below, for instance.

Seigo Fujita and three other authors, "3K07 Quasi-Zenith Satellite System: The development status of Japanese QZSS Centimeter Level Augmentation Service (CLAS): Design of Integrity Function", Proceedings of the 60th Space Sciences and Technology Conference, Sep. 6-9, 2016, Hakodate Arena, JSASS-2016-4523

The electronic reference point network 120 is configured for the first region 801 and the receivers exist in the second region 802 that is remote from the first region 801. The receivers are receivers installed on the electronic reference points 611, 612 located in the second region 802. The electronic reference point network 120 and the local error generation device 500 use SSR (State Space Representation) scheme.

<Step S21: Generation of Integrity Data>

In step S21, the supplementary information generation unit 516 generates integrity data to ensure availability of the local errors. The integrity data may be referred to as integrity information. The supplementary information generation unit 516 calculates ranging errors at positions of the electronic reference points 611, 612 based on the ionospheric delay error δI and the tropospheric delay error δT for the isolated island that are the generated local errors, calculates dispersions (standard deviations) in the ranging errors in time direction (ranging error statistics), and generates the dispersions as the integrity data. In an example taken in relation to the electronic reference point 611, the integrity data having contents ensuring the availability of the local errors is generated in case where a value of an error amount δ calculated by an expression below is smaller than a threshold.

Theoretically, δ=0 holds.

$$\delta = \phi - \rho - \{(\delta o + \delta t) + (\delta T + \delta I)\}$$

in which

φ: observed data,

ρ: geometric distance,

δo: satellite orbit error that is the global error,

δt: satellite clock error that is the global error,

δT: tropospheric delay error in the isolated island that is the local error, and δI: ionospheric delay error in the isolated island that is the local error.

<Step S22: Generation of Satellite Selection>

In step S22, the supplementary information generation unit 516 selects a plurality of satellites that are available for positioning in the second region 802 based on the local errors for each satellite. In this case, in step S23, the supplementary information generation unit 516 then generates a list of the plurality of satellites that are available for the positioning in the second region 802.

As illustrated in FIG. 2, the local error generation device 500 transmits the local errors δT, δI, the integrity data, and the lists of the satellites (S23 described above) for the isolated islands to the positioning augmentation device 130. The positioning augmentation device 130 generates new positioning augmentation information 82 including the local errors δT, δI, the integrity data, and the satellites included in the lists of the satellites and inputs the generated positioning augmentation information 82 to the master control station 140 (MCS).

In the positioning augmentation information 82, the local errors δT, δI, the integrity data, and the lists of the satellites (satellite lists S23) for the isolated islands are included.

The positioning augmentation information 82 is positioning augmentation information that covers both the first region 801 and the second region 802.

The master control station 140 (MCS) generates positioning augmentation information navigation message 83 formed in a data format (Compact SSR format) for distribution of the positioning augmentation information 82 from the quasi-zenith satellite 110.

The master control station 140 (MCS) transmits the positioning augmentation information navigation message 83 to the tracking control station 150. The tracking control station 150 modulates the positioning augmentation information navigation message 83 into uplink signals 84 and uplinks (transmits) the uplink signals 84 to the quasi-zenith satellite 110. The quasi-zenith satellite 110 relays the uplink signals 84 received from the tracking control station 150 and distributes the uplink signals 84 as downlink signals to the ground.

Thus the signals including the positioning augmentation information 82 generated in the positioning augmentation device 130 are distributed through the quasi-zenith satellite 110 to positioning receivers on the ground corresponding to the quasi-zenith satellite 110.

The tracking control station 150 may uplink the signals including the positioning augmentation information 82 to satellites, other than the quasi-zenith satellite, to distribute the positioning augmentation information. For instance, GLONASS satellites, GPS satellites, or geostationary satellites placed in geostationary orbits may be provided with a function of relaying the positioning augmentation information, so as to relay the signals including the positioning augmentation information 82.

The local error generation device 500 described above generates the ionospheric delay error δI, the tropospheric delay error δT, the integrity data, and the satellite list for each satellite. Data that are sources of those is the observed data related to the receivers on the electronic reference points 611, 612 placed in the isolated island and the positioning augmentation information 81 provided from the first-region system 1801. The data of the ionospheric delay error δI, the tropospheric delay error δT, the integrity data, and the satellite list is added to the positioning augmentation information 81 and is then distributed as the new positioning augmentation information 82 from the quasi-zenith satellite 110.

The local error generation device 500 estimates an amount of slant ionospheric delay correction and an amount of vertical tropospheric delay correction based on Kalman filter with use of a result of subtraction of the geometric distance, the amount of correction for the errors caused by the satellites (satellite clock, orbit, and signal bias), a station position variation, and an amount of distance change caused by phase wind-up effect from the observed data 61 (pseudorange observed values and carrier phase observed values of two frequencies for each satellite) obtained from the electronic reference points 611, 612 placed in the isolated island 21 in real time, as the new observed data.

Effects of Embodiment 1

(1) In the local error generation device 500, the local error estimation unit 515 estimates the local errors in the isolated islands, based on the global errors included in the positioning augmentation information 81 and the observed data at the electronic reference points in the isolated islands. According to the local error generation device 500, therefore, the positioning augmentation information for the isolated islands may be generated without influencing the positioning augmentation information for the service range of the reference station network, when the positioning augmentation information for the isolated islands is distributed.

(2) According to the local error generation device 500, not only the global errors but also the local errors may be corrected in the isolated islands as well and thus accurate positioning in a short time may be attained.

(3) The local error generation device 500 that uses the global errors estimated in the first region 801 makes the global errors common to the first region 801 and the second region 802, so that an amount of data of the positioning augmentation information to be distributed may be reduced.

Other Configurations

Figure 5:
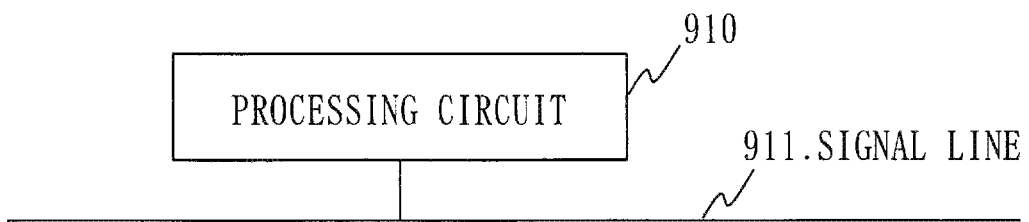
FIG. 5 is a diagram illustrating Embodiment 1 and illustrating a modification of the local error generation device 500.

FIG. 5 is a diagram illustrating a processing circuit 910. In Embodiment 1, the functions of the global error processing unit 511, the global error conversion unit 512, the observed data processing unit 513, the input data generation unit 514, the local error estimation unit 515, and the supplementary information generation unit 516 are implemented by software. In a modification, however, the functions of the global error processing unit 511, the global error conversion unit 512, the observed data processing unit 513, the input data generation unit 514, the local error estimation unit 515, and the supplementary information generation unit 516 may be implemented by hardware. That is, the functions of the global error processing unit 511, the global error conversion unit 512, the observed data processing unit 513, the input data generation unit 514, the local error estimation unit 515, and the supplementary information generation unit 516 that are illustrated as the processor 510 described above, the storage device 520, and the communication interface 530 are implemented by the processing circuit 910. The processing circuit 910 is connected to a signal line 911. The processing circuit 910 is an electronic circuit. Specifically, the processing circuit 910 is a single circuit, a composite circuit, a programmed processor, a parallelly programmed processor, a logic IC, a GA (Gate Array), an ASIC (Application Specific Integrated Circuit), or an FPGA (Field-Programmable Gate Array).

In another modification, the functions of the global error processing unit 511, the global error conversion unit 512, the observed data processing unit 513, the input data generation unit 514, the local error estimation unit 515, the supplementary information generation unit 516, the storage device 520, and the communication interface 530 may be implemented by a combination of software and hardware. The processor 510 and the processing circuit 910 are collectively referred to as "processing circuitry". The functions of the global error processing unit 511, the global error conversion unit 512, the observed data processing unit 513, the input data generation unit 514, the local error estimation unit 515, the supplementary information generation unit 516, and the storage device 520 are implemented by the processing circuitry. The operation of the local error generation device 500 may be conceived as the local error generation program. The operation of the local error generation device 500 may also be conceived as the local error generation method.

REFERENCE SIGNS LIST

21: isolated island; 51: ephemeris; 61: observed data; 81, 82: positioning augmentation information; 83: positioning augmentation information navigation message; 84: uplink signal; 110: quasi-zenith satellite; 120: electronic reference point network; 130: positioning augmentation device; 140: master control station; 150: tracking control station; 160: monitor station; 200: positioning satellite; 300: positioning terminal; 500: local error generation device; 510: processor; 511: global error processing unit; 512: global error conversion unit; 513: observed data processing unit; 514: input data generation unit; 515: local error estimation unit; 516: supplementary information generation unit; 520: storage device; 530: communication interface; 540: signal line; 611, 612: electronic reference point; 801: first region; 802: second region; 910: processing circuit; 911: signal line; 1000: generation system; 1801: first-region system; 1802: second-region system; 3000: electronic reference point; 4000: output information; 5000: error information

The invention claimed is:

1. A local error generation device comprising:
processing circuitry to:
receive positioning augmentation information for positioning, the positioning augmentation information generated by a network configured for a first region;
estimate and generate local errors that influence positioning accuracy in a second region remote from the first region, based on global errors included in the positioning augmentation information, the global errors being caused by satellites to transmit positioning signals, and on observed data generated based on the positioning signals received by a receiver that does not belong to the network and is installed at an electronic reference point located in the second region, the local errors depending on the second region where the receiver exists and being caused by propagation paths of the positioning signals, transmit the local errors to a transmission device, wherein the transmission device transmits new positioning augmentation information including the local errors transmitted from the local error generation device.

2. The local error generation device according to claim 1, wherein the processing circuitry generates integrity data to ensure availability of the local error.

3. The local error generation device according to claim 2, wherein the processing circuitry calculates a ranging error at a position of the electronic reference point based on the generated local errors and generates the integrity data with use of the ranging error.

4. The local error generation device according to claim 3, wherein the processing circuitry:
generates the local errors for each satellite of a plurality of satellites, and
selects a plurality of satellites that are available for positioning in the second region based on the local errors for each satellite.

5. The local error generation device according to claim 4, wherein the processing circuitry generates a list of the plurality of satellites that are available for the positioning in the second region.

6. The local error generation device according to claim 1, wherein the network and the local error generation device use a State Space Representation scheme.

7. A non-transitory computer readable medium including a local error generation program that causes a computer to:
receive positioning augmentation information for positioning, the positioning augmentation information generated by a network configured for a first region;
estimate and generate local errors that influence positioning accuracy in a second region remote from the first region, based on global errors included in the positioning augmentation information, the global errors being caused by satellites to transmit positioning signals, and on observed data generated based on the positioning signals received by a receiver that does not belong to the network and is installed at an electronic reference point located in the second region, the local errors depending on the second region where the receiver exists and being caused by propagation paths of the positioning signals,
transmit the local errors to a transmission device, wherein the transmission device transmits new positioning augmentation information including the local errors transmitted from the local error generation device.

8. A positioning augmentation information distribution system comprising:
a transmission device to transmit positioning augmentation information for positioning, the positioning augmentation information generated by a network configured for a first region; and
a local error generation device to:
receive the positioning augmentation information;
estimate and generate local errors that influence positioning accuracy in a second region remote from the first region, based on global errors included in the positioning augmentation information, the global errors being caused by satellites to transmit the positioning signals, and on observed data generated based on positioning signals received by a receiver that does not belong to the network and is installed at an electronic reference point located in the second region, the local errors depending on the second region and being caused by propagation paths of the positioning signals; and
transmit the local errors to the transmission device,
wherein the transmission device transmits new positioning augmentation information including the local errors transmitted from the local error generation device.

9. The local error generation device according to claim 2, wherein the network and the local error generation device use a State Space Representation scheme.

10. The local error generation device according to claim 3, wherein the network and the local error generation device use a State Space Representation scheme.

11. The local error generation device according to claim 4, wherein the network and the local error generation device use a State Space Representation scheme.

12. The local error generation device according to claim 5, wherein the network and the local error generation device use a State Space Representation scheme.

* * * * *